(12) United States Patent
Roffman et al.

(10) Patent No.: US 6,176,580 B1
(45) Date of Patent: *Jan. 23, 2001

(54) METHOD OF DESIGNING AND FITTING CONTACT LENSES TAKING INTO ACCOUNT MATERIAL PROPERTIES OF THE LENSES

(75) Inventors: Jeffrey H. Roffman; Timothy R. Poling; Denwood F. Ross, III; James A. Ebel; Timothy A. Clutterbuck, all of Jacksonville, FL (US)

(73) Assignee: Johnson & Johnson Vision Care, Inc., Jacksonville, FL (US)

( * ) Notice: Under 35 U.S.C. 154(b), the term of this patent shall be extended for 0 days.

This patent is subject to a terminal disclaimer.

(21) Appl. No.: 09/369,525

(22) Filed: Aug. 6, 1999

Related U.S. Application Data

(63) Continuation-in-part of application No. 09/286,094, filed on Apr. 2, 1999.

(51) Int. Cl.⁷ .................................................. G02C 7/04
(52) U.S. Cl. ...................... 351/177; 351/160 H; 351/161
(58) Field of Search ........................ 351/160 R, 160 H, 351/161, 162, 177

(56) References Cited

U.S. PATENT DOCUMENTS

| 5,448,312 | 9/1995 | Roffman et al. ................ 351/161 |
| 5,485,228 | 1/1996 | Roffman et al. ................ 351/161 |
| 5,682,223 | 10/1997 | Menezes et al. ................ 351/161 |
| 5,715,031 | 2/1998 | Roffman et al. ................ 351/161 |
| 5,847,802 | * 12/1998 | Menezes et al. ................ 351/161 |

OTHER PUBLICATIONS

"Using Corneal Topography" Contact Lens Spectrum, Mar. 13–15, 1999.

* cited by examiner

*Primary Examiner*—Scott J. Sugarman

(57) ABSTRACT

A method for fitting and designing ophthalmic lenses that yields improved visual acuity and takes into account individual lens fitting characteristics is provided. More specifically, the method of the invention takes into account the materials properties of the lens by observing the print-through associated with the lens.

13 Claims, 7 Drawing Sheets

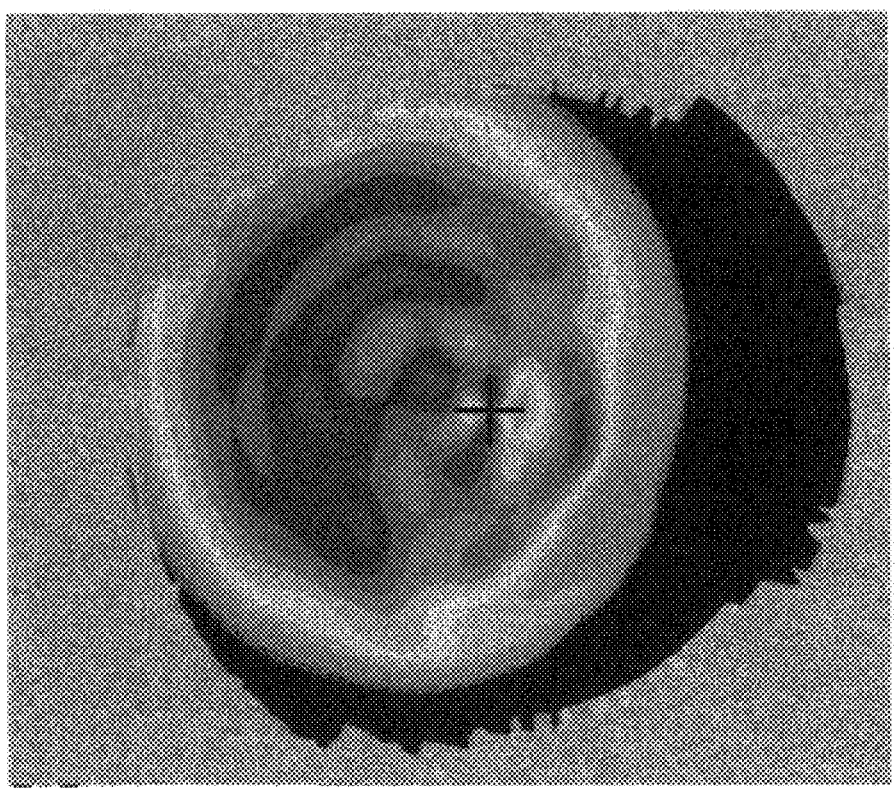
FIG. 2B
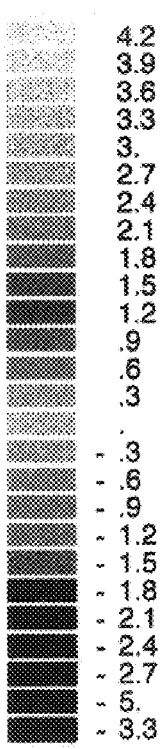

METHOD OF DESIGNING AND FITTING CONTACT LENSES TAKING INTO ACCOUNT MATERIAL PROPERTIES OF THE LENSES

This is a Continuation-in-Part (CIP) of prior application Ser. No. 09/286,094, filed Apr. 2, 1999.

FIELD OF THE INVENTION

The invention relates to contact lenses. In particular, the invention provides methods for designing and fitting contact lenses that account for the material properties of the lenses.

BACKGROUND OF THE INVENTION

The use of contact lenses for correction of visual acuity is well known. Contact lenses are presently available for correction of any number of visual acuity problems including, without limitation distance and near visual acuity. Additionally, contact lenses are available that provide cylinder correction for astigmatism caused by the shape of the eye.

In prior art lens designs, generally no allowance is made in the lens design for individual fitting characteristics of the lens. As a result, whether or not the lens is successful in correcting visual acuity depends on whether or not a proper fit is achieved. Because no allowance is made for individual lens fit, not all lenses are properly fitted. Therefore, a need exists for lens design and fitting methods that take into account the lens's individual characteristics.

BRIEF DESCRIPTION OF THE DRAWINGS

FIGS. 2A–2D are illustrations of the print-through associated with a series of progressively thicker lenses.

DETAILED DESCRIPTION OF THE INVENTION AND PREFERRED EMBODIMENTS

The invention provides a method for designing and fitting ophthalmic lenses that takes into account the individual fitting characteristics of the lens. More specifically, it is an unexpected discovery of the invention that, by taking into account the print-through associated with a lens, improved lens fit and optical effect may be achieved. By "print-through" is meant any change in lens topography on the front, or convex, surface resulting from changes of topography on the back, or concave, lens surface.

In one embodiment, the invention provides a method for fitting an ophthalmic lens comprising, consisting essentially of and consisting of a.) placing a lens on a cornea, at least one surface, preferably the concave surface, of the lens comprising, consisting essentially of, and consisting of a surface pattern; and b.) determining an amount of print-through for the surface pattern. Optionally, the surface pattern may be modified in accordance with the print-through determined. By "ophthalmic lens" is meant a contact lens, an intra-ocular lens, an onlay lens, and the like. Preferably, the lens used in the invention is a contact lens.

The lens surface pattern may be any of a wide variety of patterns. Suitable patterns include, without limitation, zones of alternating refractive power as disclosed in U.S. Pat. Nos. 5,448,312, 5,485,228, and 5,835,192 incorporated in their entireties herein by reference as well as, cylinder, spheres, aberrated spheres, aspheres, surfaces calculated from topographic measurements or topographically-derived surfaces, surfaces calculated from wave front measurements, and the like and combinations thereof.

Figure 1:
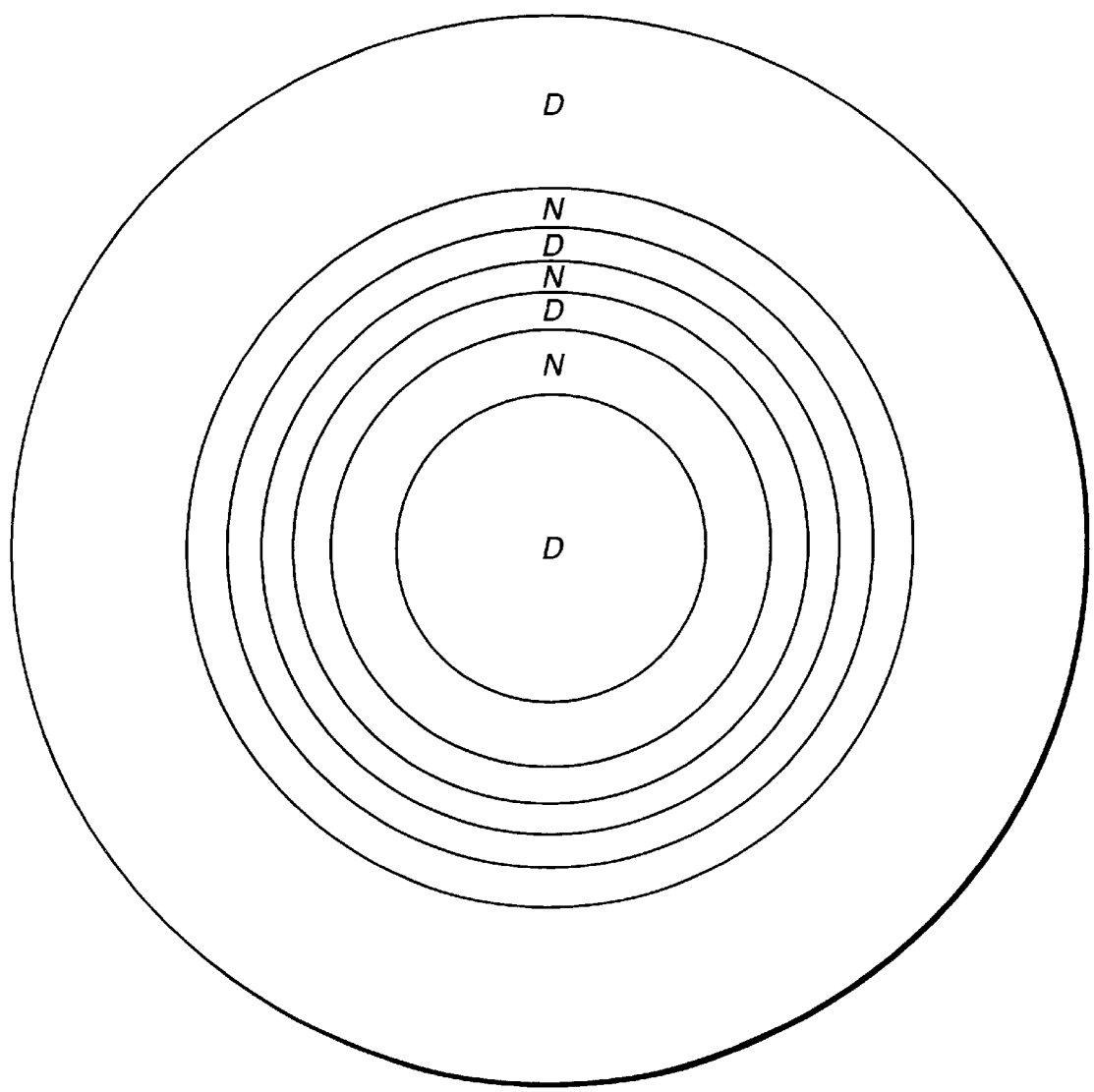
FIG. 1 is a plan view of the optical zone of a lens.

FIG. 1 depicts the optical zone of a contact lens that has a central area containing a prescribed prescription spherical distance power, along with a plurality of alternating spherical near power and spherical distance power annular rings. When the central area and the annular rings are formed on the concave surface of the lens, these features print-through to the convex lens surface on which they appear as attenuated features. The amount of print-through is a function of the thickness of the lens and the properties of the lens material, such as stiffness and elasticity.

In accordance with the present invention, by observing this print-through of the back surface features, either or both the lens design and the actual lens may be changed. For example, in the lens of FIG. 1, if a significant amount of print-through is observed using a corneal topographer or video keratoscope, this generally indicates that the multifocal function of the lens is being performed. In this situation, the clinician may adjust the add power of the lens to the desired level by either increasing or decreasing it. The resulting add power then will be implemented with the proper multifocal effect.

In contrast, if there is no significant amount of print-through, generally the multifocal function, or other function, of the lens is not being properly performed. For example, loss or decrease of the multifocal effect indicates that the lens is performing more like a monofocal lens. In this situation, observation of the reduced print-through permits the clinician to bias one lens of a pair for distance power and the other lens of a lens pair for near power. Alternatively, each lens of the lens pair may be biased for some combination of distance and near power.

The loss of print-through effectively places an upper limit on the lens' optic zone thickness. Also, by analyzing the on-eye characteristics of the lens it is possible to determine how to vary the fit so as to improve the lens fit and resulting performance. The amount of print-through may be compared against one or more thresholds to determine whether or not the amount of print-through is significant. For example, a single threshold may be used or, alternatively, two thresholds may be used.

In the latter case, if the observed amount of print-through is greater than a first, higher threshold, then an indication is made that the print-through is significant. Similarly, if the observed amount of print-through is lower than a second, lower threshold, an indication may be made that the print-through is not significant. As yet another alternative, a sliding scale or continuum of thresholds may be used.

On-eye observation of the print-through and its effects on visual acuity permit the clinician to decide between various courses of action in lens fitting including, without limitation, adjusting distance, near or add power, changing cylinder power, fitting a lens as a modified monovision lens, and the like, and combinations thereof. Providing on-eye information additionally permits fitting a lens with an optimum center thickness while retaining a desired amount of print-through. Optimum center thickness for the lens will balance the need to have a lens sufficiently thick to facilitate easy handling while permitting the desired amount of print-through. Preferably, the center thickness is about 50 to about 150 µm.

Figure 2A:
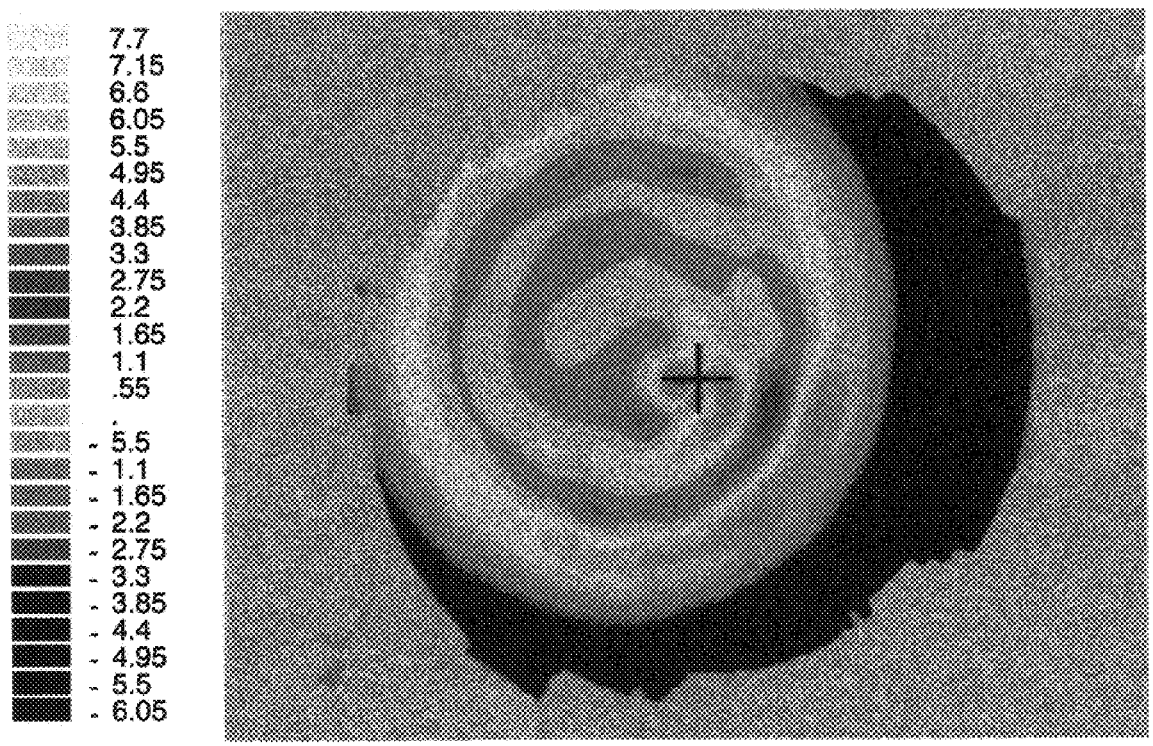
Figure 2C:
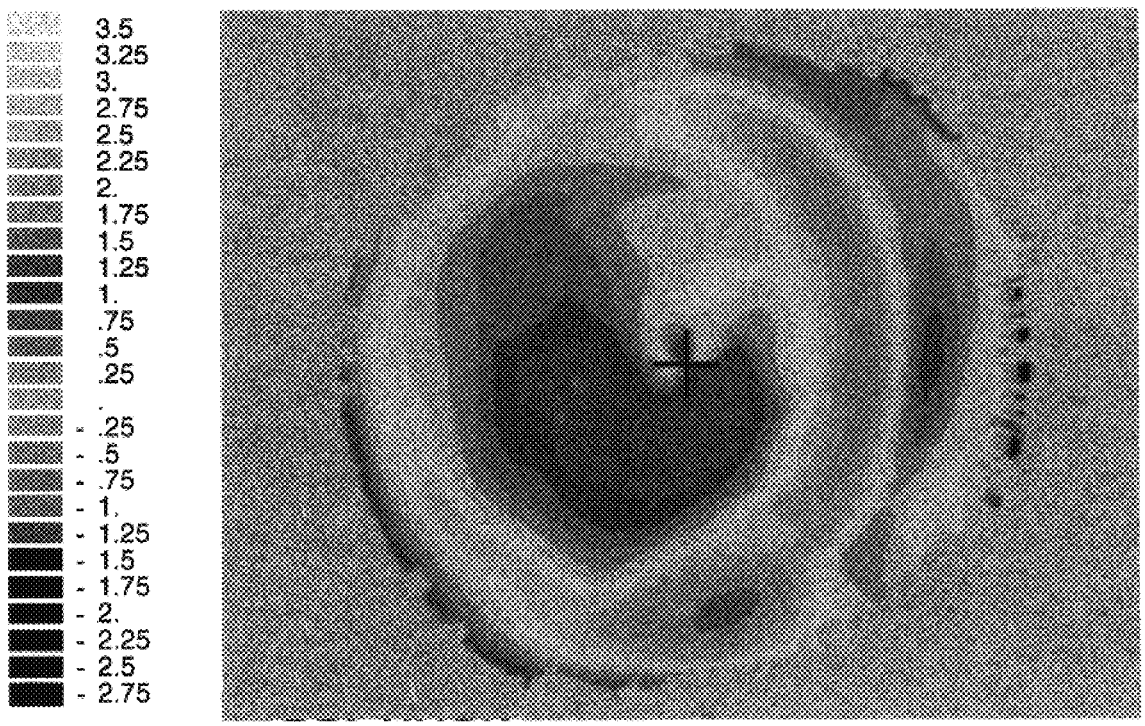
Figure 2D:
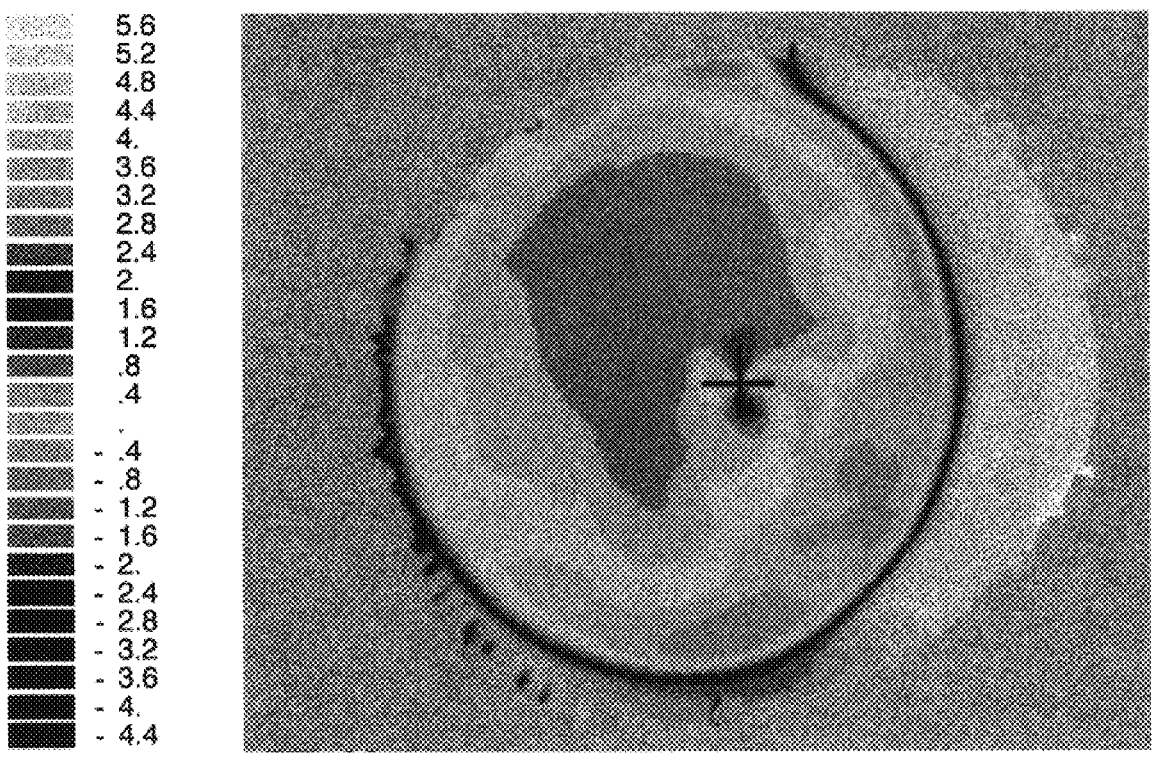
Figure 3A:
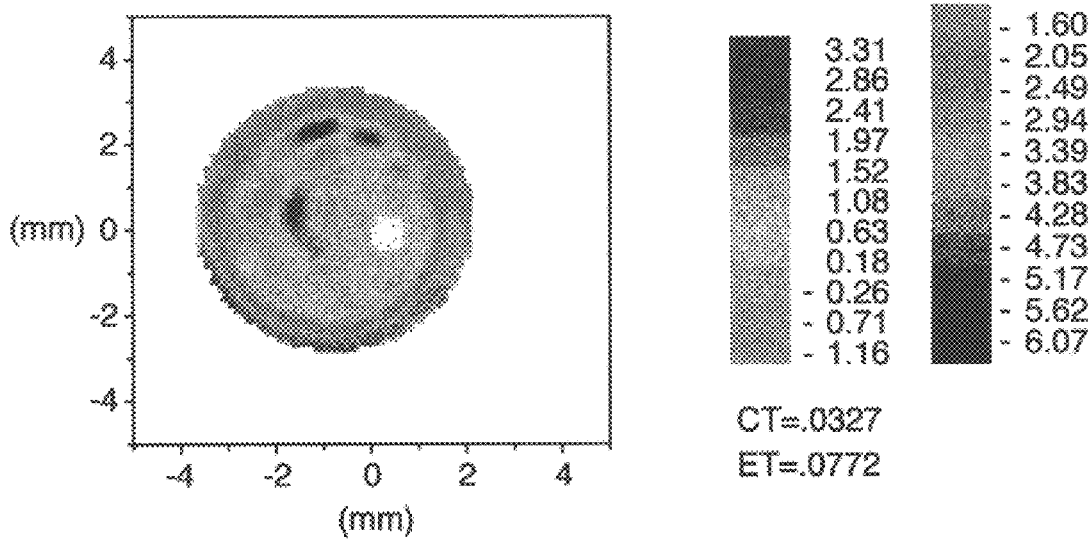
FIGS. 3A–3D are illustrations of the print-through associated with a series of progressively thicker lenses.
Figure 3B:
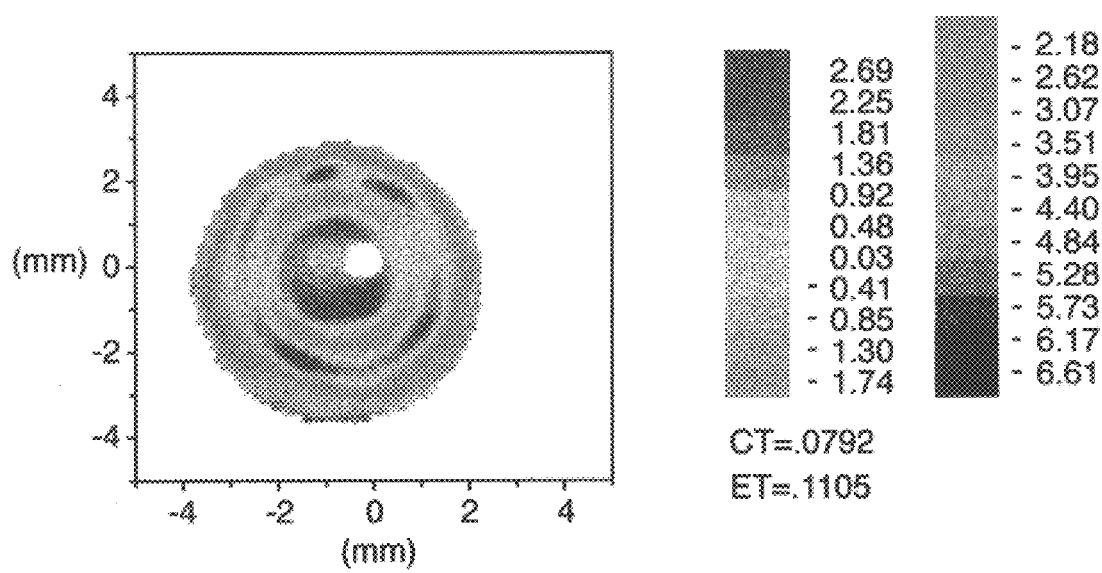
Figure 3C:
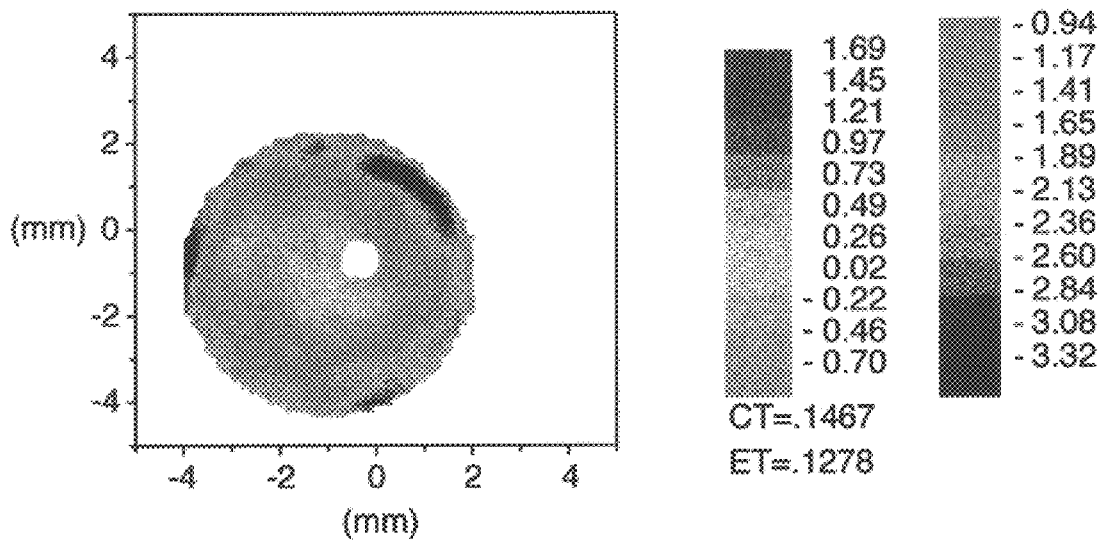
Figure 3D:
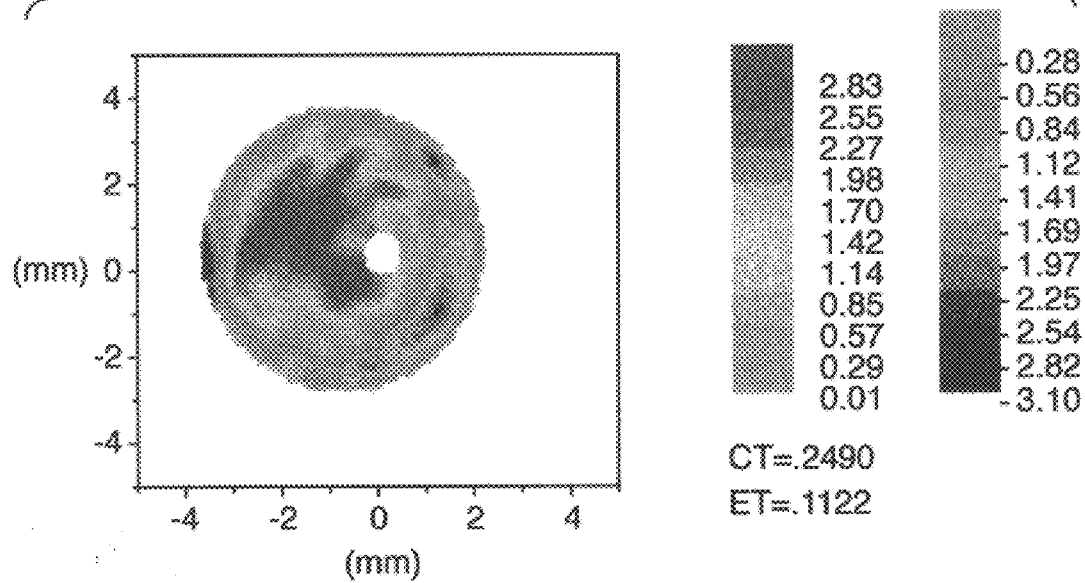

Referring to FIGS. 2A through 2D, therein is illustrated a sequence of diagrams depicting various amounts of print-through observed on lenses with the same concave pattern of concentric annular rings, but with progressively increasing center thicknesses. The lens in FIG. 2A is the thinnest lens; the lens in FIG. 2D is the thickest lens. The center thickness of the lenses of FIGS. 2A–2D are 50, 100, 200, and 300 μm. respectively. FIGS. 2A through 2D illustrate the loss of print-through as the lens thickness increases. As shown in the thin lens of FIG. 2A, a substantial amount of print-through is observable in comparison with the thickest lens 2D, in which minimal print-through is observable. FIGS. 3A through 3D is another illustration of a sequence of print-through in lenses with center thicknesses of 50, 100, 200, and 300 μm. respectively.

Suitable materials used to form the lenses of the invention are those that permit print-through of the surface pattern. Preferably, the material selected for forming the lenses of the invention is a low modulus material. By "low modulus" is meant a modulus of about 20 to about 60, preferably about 20 to about 40 psi. Suitable materials for forming contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, poly-dimethyl siloxane macromers, methacryloxypropyl poly-alkyl siloxanes, and mixtures thereof, silicone hydrogel or a hydrogel, such as etafilcon A.

Although several embodiments and variations of the present invention are described herein, it is to be apparent that the disclosure and teachings of the invention will suggest many alternative designs to those ordinarily skilled in the art.

What is claimed is:

1. A method for fitting an ophthalmic lens comprising the steps of placing a lens at least one surface of which comprises a surface pattern on a cornea; and determining an amount of print-through of the surface pattern.

2. The method of claim 1, wherein the at least one surface is the concave surface.

3. The method of claim 1, wherein the lens is a contact lens.

4. The method of claim 1, wherein the surface pattern is zones of alternating refractive power, cylinder power, spheres, aberrated spheres, aspheres, surfaces calculated from topographic measurements or topographically-derived surfaces, surfaces calculated from wave front measurements, or combinations thereof.

5. The method of claim 1, further comprising modifying the surface pattern in accordance with the print-through determined.

6. The method of claim 1, wherein the determining step comprises using a corneal topographer.

7. The method of claim 1, wherein the determining step comprises determining a change in lens topography on the convex surface of the lens as a result of a change in topography on the concave surface of the lens.

8. The method of claim 1, further comprising determining whether the print-through is greater than a first predetermined amount.

9. The method of claim 1, further comprising the step of determining whether the print-through is less than a second predetermined amount.

10. The method of claim 8, wherein provided that the print-through is greater than the first predetermined amount, the modifying step comprises adjusting the lens' distance power, near power, add power, cylinder power, or combinations thereof.

11. The method of claim 10, wherein the modifying step comprises adjusting the add power.

12. The method of claim 10, wherein the modifying step comprises adjusting the cylinder power.

13. The method of claim 9, wherein is the print-through is less than the second predetermined amount, the modifying step comprises biasing the lens for distance vision.

* * * * *